United States Patent [19]

Joseph et al.

[11] Patent Number: 5,013,362
[45] Date of Patent: May 7, 1991

[54] FLUORINE-FREE SUPEROPAQUE ENAMEL FRITS

[75] Inventors: Werner Joseph, Cologne; Hans-Joachim Schittenhelm, Leverkusen, both of Fed. Rep. of Germany

[73] Assignee: Bayer Aktiengesellschaft, Leverkusen-Bayerwerk, Fed. Rep. of Germany

[21] Appl. No.: 512,565

[22] Filed: Apr. 23, 1990

Related U.S. Application Data

[63] Continuation of Ser. No. 230,308, Aug. 9, 1988, abandoned.

[30] Foreign Application Priority Data

Aug. 19, 1987 [DE] Fed. Rep. of Germany ....... 3727644

[51] Int. Cl.$^5$ ............................................... C03C 8/00
[52] U.S. Cl. .................................... 501/24; 501/65; 501/66; 501/67; 501/69; 501/70; 501/73; 501/77
[58] Field of Search ............... 501/24, 65, 66, 67, 501/69, 70, 73, 77

[56] References Cited

U.S. PATENT DOCUMENTS 3,216,847  11/1965  Armant ............................... 501/14
3,836,373   9/1974  Ault et al. ........................... 501/67

FOREIGN PATENT DOCUMENTS 1482766  6/1966  France .
59-162144  9/1984  Japan ................................. 501/24

OTHER PUBLICATIONS

Chem. Abs. 99:42500n.
Chem. Abs. 90:173473t.
Chem. Abs. 90:173476w.

Primary Examiner—Mark L. Bell
Assistant Examiner—Anthony J. Green
Attorney, Agent, or Firm—Connolly and Hutz

[57] ABSTRACT

Fluorine-free titanium white enamel frits for enamelling steel consisting essentially of:
35 to 45 parts by weight of the sum of $SiO_2$ and $ZrO_2$,
18 to 22 parts by weight of $TiO_2$,
18 to 22 parts by weight of the sum of $B_2O_3$ and $Al_2O_3$,
15 to 18 parts by weight of alkali metal oxides,
2.5 to 4.5 parts by weight of $P_2O_5$, and
0.8 to 1.4 parts by weight alkaline earth metal oxides;
with the proviso that the ratio of atomic numbers is as follows:
(A+2B) to C is 0.9±0.05,
(lithium+0.5 magnesium) to phosphorous is 1±0.1, and sodium to potassium is 1.2 to 2.6,
wherein A is the sum of monovalent atoms, B is the sum of divalent atoms and C is the sum of trivalent atoms.

10 Claims, No Drawings

FLUORINE-FREE SUPEROPAQUE ENAMEL FRITS

This application is a continuation of application Ser. No. 230,308, filed Aug. 9, 1988, now abandoned.

This invention relates to fluorine-free super-opaque enamel frits frosted by the precipitation of $TiO_2$ for the enamelling of sheet steel.

BACKGROUND OF THE INVENTION

The frosting of titanium white enamel [T.B. Yee, A.I. Andrews: J. Amer. Ceram. Soc. 39 (1956), p.188] is based on the crystallization of titanium dioxide from transparent glass matrix during stoving of the frit on the steel substrate. The desired optical properties such as brightness, color location [DIN 5033 and DIN 6174 or ASTM D 2244] and covering power [F.R. Meyer, Ber. Dtsch. Keram. Ges. 28 (1951), p. 205] are produced by the precipitation of particular $TiO_2$ crystal phases in a particle size suitable for producing an optically cloudy effect.

Titanium white enamel has in the past been developed purely empirically. It is known that the $B_2O_3/TiO_2$ ratio [V.V. Vargin, G.P. Smirnova, Steklo i Keram. (1962) 8, p. 35] and the alkali metal content [A.L. Friedberg, F.A. Petersen et al, J. Amer. Ceram. Soc. 30 (1947), p.261] influence the quantity of $TiO2$ precipitated while $P_2O_5$ [R.D. Shannon, A.L. Friedberg, III Univ. Eng. Exp. Sta. Bull. 456 (1960)] promotes anatase recrystallization. Furthermore, high quality super-opaque enamels resistant to firing contain a few percent by weight of fluorine (A.L. Friedberg, F.A. Petersen et al, J. Amer. Ceram. Soc. 33 (1950), p. 17: F. Imoto, G. Yamaguchi et al, J. Ceram. Assoc. Jap. 61 (1953), p.97] in the melt composition. This element fulfills numerous functions. It assists opening up of the mixture of raw materials in the fusion process, facilitates melting of the frit during stoving by its lowering of the viscosity and stabilizing the precipitation of $TiO_2$.

On the other hand, when fluorine is used as component of enamel frits, it causes ecological problems in the manufacture and processing of the frits. It gives rise to gaseous fluorine compounds, especially during melting of the mixture of raw materials and also during stoving of the frits. Removal of these gaseous compounds from the streams of exhaust gas issuing from the melting and stoving furnaces is difficult and expensive.

Attempts to develop titanium white enamel which is free from fluorine have hitherto only provided unsatisfactory results. The elimination of fluorine (A. Tomsia, C. Kozubek et al.,Mitt. VDEfa 24 (1976),p.71; D.F. Usakov, G.V. Kirilenko et al , Steklo i. Keram.(1982) 6,p.13) from titanium white enamel resulted in hard frits which not only necessitated higher stoving temperatures but also were distinctly inferior to conventional commercial enamel frits in their optical properties of opaqueness, such as covering power, and in their resistance to firing.

The problem therefore arose of producing enamel frits free from fluorine which would be comparable in their properties and in the production process to ordinary commercial enamel frits but would have the advantage of not causing any ecological problems in their production and processing and would not require an expensive process of working up the exhaust air.

BRIEF DESCRIPTION OF THE INVENTION

It has now surprisingly been found that the above-mentioned qualitative disadvantages of enamel frits which are free from fluorine can be avoided by observing the following proportions, expressed as atomic ratio numbers, when formulating the compositions of the melt:

[Σ monovalent atoms+2Σ divalent atoms]:Σ trivalent atoms = 0.9±0.05

[Σ Li atoms+0.5Σ Mg atoms]:Σ P-atoms = 1±0.1 Σ Na atoms: Σ K-atoms = 1.2-2.6, the fluorine free titanium white enamel frits containing from 35-45% by weight, preferably from 39 to 41% by weight of $(SiO_2+ZrO_2)$, from 18-22% by weight, preferably from 20-22% by weight of $TiO_2$, from 18-22% by weight, preferably from 18-20% by weight of $(B_2O_3+Al_2O_3)$, from 15-18% by weight, preferably from 16-18% by weight of alkali metal oxides, from 2.5-4.5% by weight, preferably from 2.6-3.5% by weight of $P_2O_5$ and from 0.8-1.4% by weight, preferably from 0.8-1.1% by weight of alkaline earth metal oxides.

DETAILED DESCRIPTION

Accordingly, the present invention relates to fluorine-free titanium white enamel frits for enamelling steel which consist essentially of:

35 to 45 parts by weight of the sum of $SiO_2$ and $ZrO_2$.
18 to 2parts by weight of $TiO_2$.
25 18 to 22 parts by weight of the sum of $B_2O_3$ and $Al_2O_3$,
15 to 18 parts by weight of alkali metal oxides,
2.5 to 4.5 parts by weight of $P_2O_5$. and
0.8 to 1.4 parts by weight alkaline earth metal oxides;
with the proviso that the ratio of atomic numbers is as follows:

(A+2B) to C is 0.9±0.05,
(lithium +0.5 magnesium) to phosphorous is 1±0.1, and
sodium to potassium is 1.2 to 2.6, wherein A is the sum of monovalent atoms. B is the sum of divalent atoms and C is the sum of trivalent atoms.

The atomic numbers may easily be calculated by a method analogous to that used for determining a chemical formula after analysis, by dividing the oxidic composition in per cent by weight by the corresponding molecular weights and expressing the ratios of the figures obtained in whole numbers as far as possible.

The $ZrO_2$ content in the enamel frits preferably amounts to not more than 10% by weight of the $(SiO_2+ZrO_2)$ content, and the $Al_2O_3$ content preferably amounts to not more than 10% by weight of the $(B_2O_3+Al_2O_3)$ content.

The fluorine-free titanium white enamel obtained by melting these compositions in the usual manner are comparable to commercially available super-opaque frits in their technical properties as enamels and from ecological aspects they are superior to them in the conditions required for their preparation and processing.

The enamel frits according to the invention are obtained by melting commercial enamel raw materials such as borax ($Na_3B_4O_7.5H_2O$), boric acid, quartz powder, zirconium sand, magnesite, aluminium metaphosphate, titanium dioxide and the carbonates of sodium, potassium and lithium at about 1200° C. and then chilling the melt with water-cooled steel rolls. The resulting flakes are applied both as enamel powders in the electrical field (as described generally in German Patent Specification 2,025,072) and as aqueous substances in the form of slips by immersion or by spraying the aqueous substances On strips of sheet steel 1 mm in thickness, 45 cm in length and 6 cm in width. The metal strips are manufactured from decarbonized steel and the surface is degreased, pickled and nickel plated, which is a necessary precondition for stoving enamel frits which are free from adhesive oxide (A.H Dietzel, Emaillierung, Springer Verlag 1981, page 214 et seq).

Stoving of steel substrates either coated with powder or coated with slip is carried out in a temperature gradient furnace for 10 minutes, normally at temperatures in the range of from 750 to 900° C. The fluorine-free frits can be stoved perfectly at temperatures from 810 to 840° C. The thickness of the layer of stoved enamel frits thereby obtained is from 0.14 to 0.1 mm.

The fluorine-free super-opaque enamel frits according to the invention are described in more detail below with the aid of Examples which should not be regarded as a limitation.

EXAMPLES

Enamel frits A, B, C obtained from commercial raw materials conventionally used for the preparation of enamel frits were melted in a 500 ml fireclay crucible placed in an electrically heated muffle furnace at 1220° C.:

| | Atomic number per 10,000 | | |
|---|---|---|---|
| | Frit A | Frit B | Frit C |
| Si | 3218 | 3230 | 3218 |
| B | 2609 | 2750 | 2607 |
| Al | 91 | 88 | 91 |
| Ti | 1368 | 1311 | 1364 |
| Zr | 87 | 84 | 88 |
| P | 202 | 186 | 194 |
| Li | 137 | 150 | 151 |
| Na | 1192 | 1500 | 1199 |
| K | 991 | 602 | 986 |
| Mg | 102 | 96 | 99 |
| Co | 3 | 3 | 3 |
| Σ | 10 000 | 10 000 | 10 000 |
| $[\Sigma(Na + K + Li) + 2\Sigma Mg]:\Sigma(B + Al) =$ | | | 0.93 Frit A |
| | | | 0.86 Frit B |
| | | | 0.94 Frit C |
| $[\Sigma Li + 0.5\Sigma Mg]:\Sigma P =$ | | | 0.93 Frit A |
| | | | 1.06 Frit B |
| | | | 1.03 Frit C |
| $\Sigma Na:\Sigma K =$ | | | 1.20 Frit A |
| | | | 2.49 Frit B |
| | | | 1.22 Frit C |

The homogenous melts were chilled between two rotating steel rollers after a residence time in the furnace of 35 to 40 minutes and the resulting glass band was then size reduced. 100 g of the resulting flakes from each frit were used to prepare a mill batch of the following composition which was ground to a slip in a Bloch-Rosetti porcelain ball mill:

| | % by weight |
|---|---|
| Frit | 100 |
| Blue clay | 3 |
| Sodium aluminate | 0.1 |
| Potash | 0.2 |
| Water | 48 |
| Density | 1.72 |
| Screen residue | 1 (screen mesh 60 μm) |

To assess the stability under firing conditions, the slip of the enamel frits A, B, C was applied by spraying to steel sheets measuring 10×10 cm and 1 mm thickness which had been coated with base enamel in the usual manner and after drying the slip was stoved at 320° C. for 3 minutes and again at 820° C. for 2 minutes.

To check the resistance under firing conditions, the brightness reference value L and the color locations a and b were determined according to DIN 6174 after one stoving and after two stovings. The colour difference ΔE between the first and the second stoving is less than 0.5 and therefore comparable to that of conventional titanium white enamel which contains fluorine.

To determine the covering power, frits A, B and C according to the invention and a commercial titanium white enamel D containing fluorine, all having approximately the same brightness L, were evenly applied in layers of increasing thickness (about 1,2,3,4 and 2g of enamel/dm²) to black enamel sample plates measuring 10×10 cm, dried and stoved at 820° C. for 3 minutes The brightness reference values L were plotted against the weight of enamel applied (g of enamel/dm²). The covering power is defined as the reciprocal of the weight applied (g/dm²) at which 95% of the final brightness ($R\infty$) is reached.

| | Frits A,B,C | Frit D |
|---|---|---|
| Final brightness ($R\infty$) | 78.9–79.3 | 79.5 |
| 95% of $R\infty$ | 75.0–75.3 | 75.5 |
| Weight applied g/dm² | 1.49–1.52 | 1.45 |
| Covering power | 0.67–0.66 | 0.69 |

What is claimed is:

1. Fluorine-free, opaque titanium white enamel frits having improved covering power for enamelling steel consisting essentially of:
   35 to 45 parts by weight of $SiO_2$, $ZrO_2$ or a mixture thereof,
   18 to 22 parts by weight of $TiO_2$,
   18 to 22 parts by weight of $B_2O_3$, $Al_2O_3$ or a mixture thereof, 15 to 18 parts by weight of a mixture of lithium, sodium and potassium oxides,
   2.5 to 4.5 parts by weight of $P_2O_5$, and
   0.8 to 1.4 parts by weight of magnesium oxide,
   with the proviso that the ratio of atomic numbers is as follows:
   (A+2B) to C is 0.9±0.05,
   (lithium+0.5 magnesium) to phosphorus is 1±0.1, and sodium to potassium is 1.2 to 2.6,
   wherein A is the sum of monovalent atoms, B is the sum of divalent atoms and C is the sum of trivalent atoms.

2. Enamel frits according to claim 1 wherein the $ZrO_2$ content is a maximum of 10% by weight of the $SiO_2$ and $ZrO_2$ content and the $Al_2O_3$ content is a maximum of 10% by weight of the $B_2O_3$ and $Al_2O_3$ content.

3. Enamel frits according to claim 1 wherein the sum of $SiO_2$ and $ZrO_2$ is 38 to 41 parts by weight.

4. Enamel frits according to claim 1 wherein the $TiO_2$ content is 20 to 22 parts by weight.

5. Enamel frits according to claim 1 wherein the sum of $B_2O_3$ and $Al_2O_3$ is 18 to 20 parts by weight.

6. Enamel frits according to claim 1 wherein the content of the mixture of lithium sodium and potassium oxides is 16 to 18 parts by weight.

7. Enamel frits according to claim 1 wherein the Phd $2O_5$ content is 2.6 to 3.5 parts by weight.

8. Enamel frits according to claim 1 wherein the content of magnesium oxide is 0.8 to 1.1 parts by weight.

9. Fluorine-free opaque titanium white enamel frits having improved covering power for enamelling steel consisting essentially of:
38 to 41 parts by weight of $SiO_2$, $ZrO_2$ or a mixture thereof,
20 to 22 parts by weight of $TiO_2$,
18 to 20 parts by weight of $B_2O_3$, $Al_2O_3$ or a mixture thereof,
16 to 18 parts by weight of a mixture of lithium, sodium and potassium oxides,
2.5 to 3.5 parts by weight of $P_2O_5$, and
0.8 to 1.1 parts by weight of magnesium oxide;
with the proviso that the ratio of atomic numbers is as follows:
(A+2B) to C is 0.9±0.05,
(lithium+0.5 magnesium) to phosphorous is 1±0.1, and sodium to potassium is 1.2 to 2.6,
wherein A is the sum of monovalent atoms, B is the sum of divalent atoms and C is the sum of trivalent atoms.

10. Enamel frits according to claim 9, wherein the $ZrO_2$ content is a maximum of 10% by weight of the $SiO_2$ and $ZrO_2$ content and the $Al_2O_3$ content is a maximum of 10% by weight of the $B_2O_3$ and $Al_2O_3$ content.

* * * * *